J. M. EADIE.
TURNING DEVICE FOR VEHICLES.
APPLICATION FILED AUG. 6, 1908.
1,028,866.
Patented June 11, 1912.
4 SHEETS—SHEET 3.
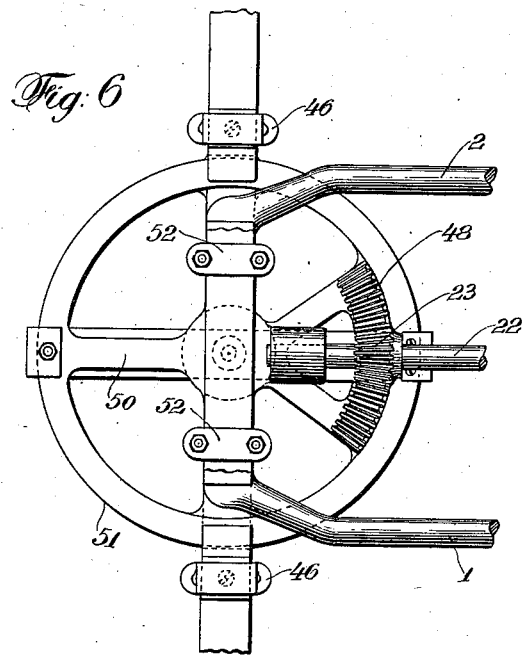
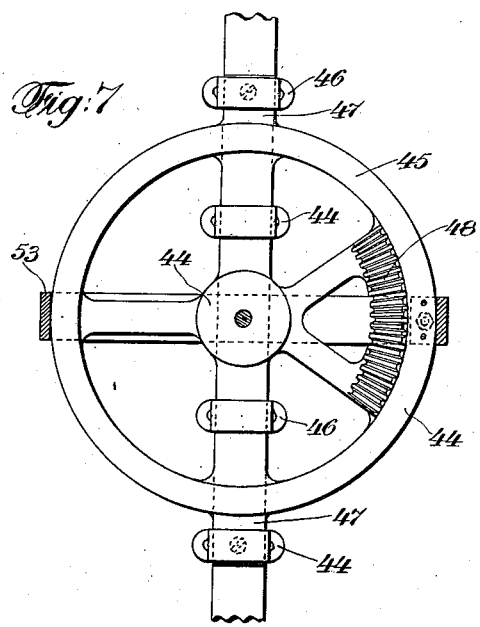
Witnesses:
Inventor
John M. Eadie
By his Attorneys
Kenyon & Kenyon J. M. EADIE.
TURNING DEVICE FOR VEHICLES.
APPLICATION FILED AUG. 6, 1908.
1,028,866.
Patented June 11, 1912.
4 SHEETS—SHEET 4.
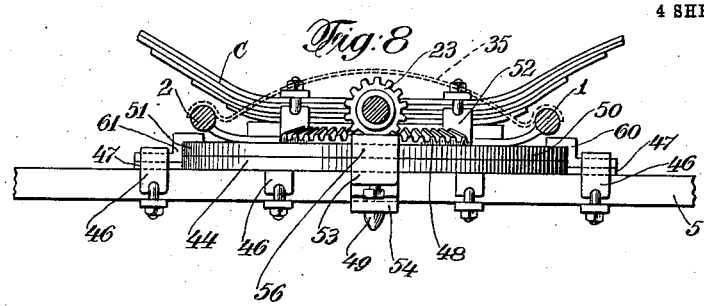
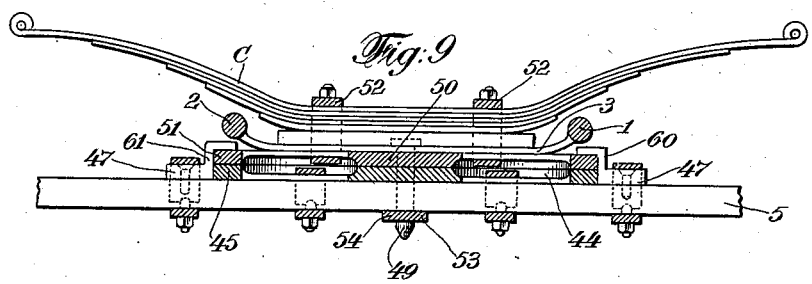
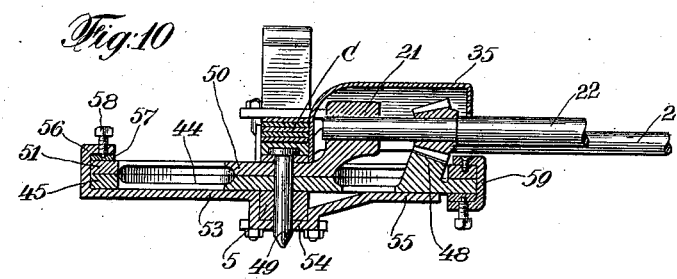
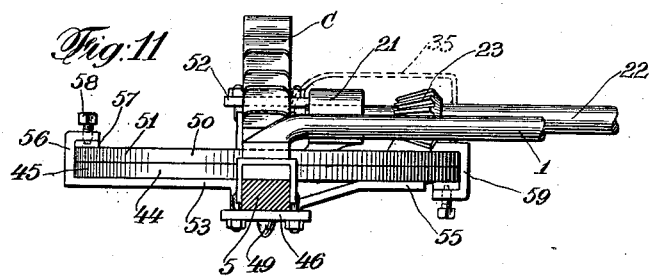
Witnesses:
Geo McHarris.
John O. Gumpler
Inventor
John M. Eadie
By his Attorneys
Kenyon & Kenyon.
COLUMBIA PLANOGRAPH CO., WASHINGTON, D. C.

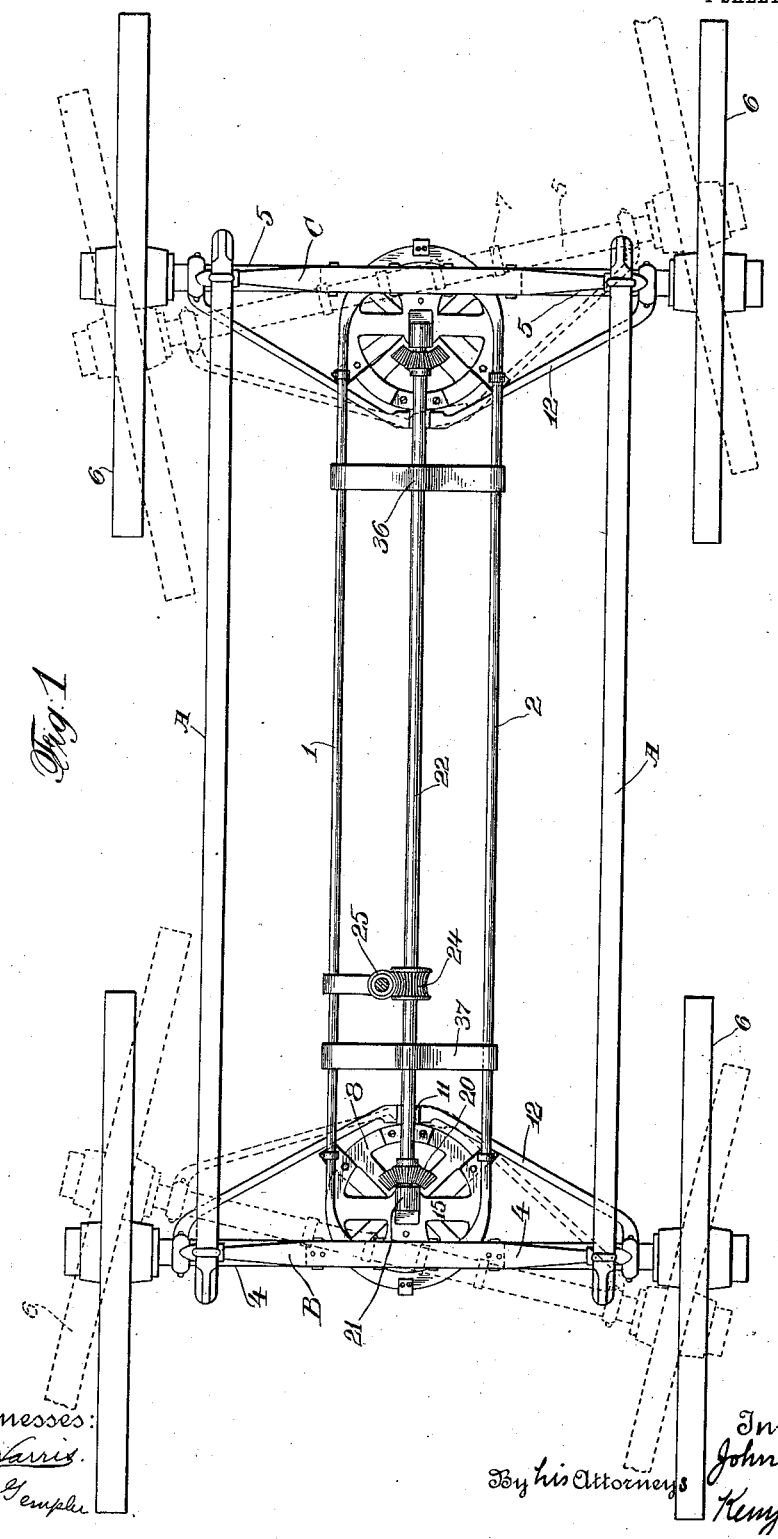

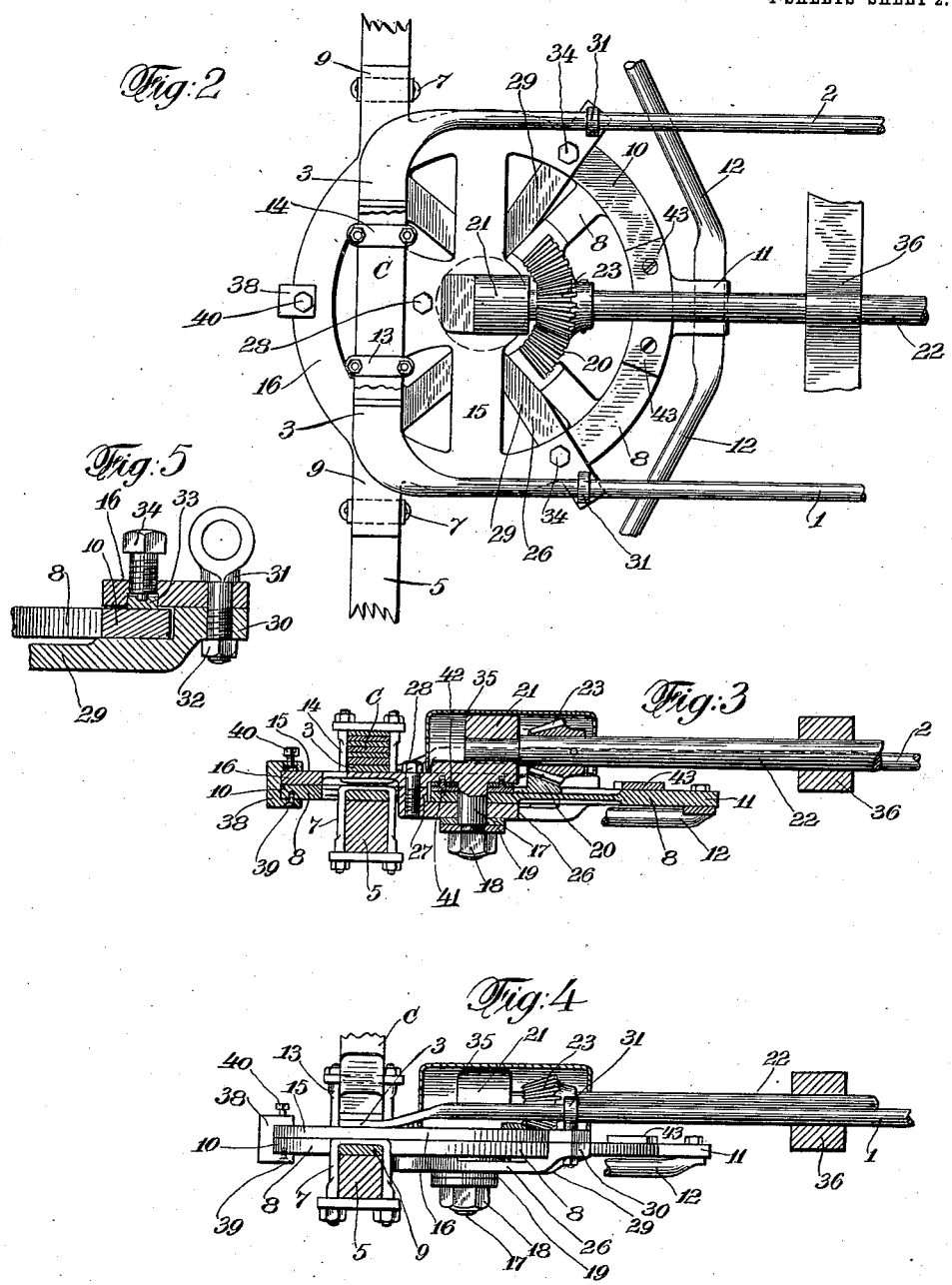

UNITED STATES PATENT OFFICE.

JOHN M. EADIE, OF NEW YORK, N. Y., ASSIGNOR TO EADIE VEHICLE GEAR COMPANY, A CORPORATION OF NEW JERSEY.

TURNING DEVICE FOR VEHICLES.

1,028,866.  Specification of Letters Patent.  Patented June 11, 1912.

Application filed August 6, 1908. Serial No. 447,205.

*To all whom it may concern:*

Be it known that I, JOHN M. EADIE, a subject of the King of Great Britain, and a resident of the city, county, and State of New York, have invented certain new and useful Improvements in Turning Devices for Vehicles, of which the following is a specification.

My invention relates to steering and turning devices for vehicles and is especially designed with reference to short turning vehicles. Prior devices of this kind have been found impracticable and have wholly failed in commercial operation. This, I find, has been due very largely to the fact that proper means have not been provided to take the unnatural stresses to which such vehicles are subject and to relieve the various parts of the mechanism of all stresses except those which they are normally designed to bear. Great trouble has also been met with in prior devices in that they are subject to rattling and to wabbling or zigzagging.

I provide a short turning vehicle having both a fifth and sixth wheel mechanically connected together through racks and pinions and a longitudinal shaft to permit the axles to oppositely and simultaneously turn.

The releasing of the rear axle from the normal rigidly held position creates new and different mechanical strains and stresses on the various parts and it is one important object of my invention to so construct and combine the various parts as to practically eliminate all unnatural stresses, allowing each part to receive only the stresses which it should naturally be called upon to bear. Thus I have so devised the various elements that no substantial stress is placed upon the rear king-bolt, except the direct pulling stress, thus permitting it to satisfactorily perform its pivotal function. I have also so devised and combined the various elements so that the rack and pinion will always be properly in mesh, despite the various positions of the vehicle in turning and on rough roads. And generally speaking, by my invention the various elements are so constructed and arranged that, although the rear axle is released, the load is rigidly sustained.

Other objects of my invention involve the construction of a vehicle that will be economical in construction, readily repairable and of pleasing appearance, while eliminating all unnecessary weight.

In prior vehicles in which a short turning has been attempted by providing a sixth wheel, these objects have not been properly taken into consideration, no provision seeming to have been made to meet the special problems arising when the rear axle is released. The result has been that, although vehicles of this class have been hitherto suggested, there has been no general commercial use of such vehicles. Thus when the prior vehicles were loaded more heavily upon one side than the other a large amount of the strain was taken from one side of the fifth or sixth wheels and placed upon the king-bolt or upon the other side of said wheels, causing said wheels to crush or cause the king-bolt to snap. Or, even if the strains and stresses were insufficient to cause this, there would be an uneven wear of the wheels and king-bolt which is very detrimental to the satisfactory operation of the vehicle. Furthermore when the rear axle was given a turn, in the old devices, a similar unbalancing of the load took place with equally disastrous results. It was found that these prior devices would not stand up under any reasonable test, primarily for these reasons. Moreover, the loose arrangement in prior devices was found to permit and conduce to wabbling and zigzagging, which is one of the most detrimental defects to such a device.

To the ends above mentioned, my invention involves various novel combinations and arrangements of parts, as well as the introduction of several new elements, all of which will be better understood from the drawings taken in connection with the following description, the same being more particularly set out hereinafter in the claims.

Figure 1 is a plan view of one embodiment of various of my improvements as applied to a vehicle frame. Fig. 2 is an enlarged plan view of similar parts as applied to one of the axles. Fig. 3 is a vertical section of the device shown in Fig. 2. Fig. 4 is a vertical side view of the arrangement shown in Fig. 2. Fig. 5 is a detail view of a clip arrangement used in connection with the device shown in Figs. 2, 3 and 4. Fig. 6 is a plan view of a modification embodying various of my improvements. Fig. 7 is a similar view with the upper or bearing plate, shaft and springs removed. Fig. 8 is a vertical end view of the arrangement shown in Fig. 6. Fig. 9 is a vertical section thereof taken in the plane of the axle. Fig. 10 is a vertical section of the arrangement shown in Fig. 6, but taken at right angles to that shown by Fig. 9; and Fig. 11 is a vertical side view of the device shown in Fig. 6.

Referring to Figs. 1 to 5 inclusive, A represents the frame of a vehicle resting on front and rear springs B and C respectively. In general the body of the vehicle rests upon this frame, but the frame and the parts securely fixed thereto may all be considered a part of the body. The springs B and C are further rigidly held in place by reaches 1 and 2 which are preferably made integral with each other at the ends by means of a flattened cross piece 3, (see Fig. 2). The vehicle is provided with the usual front and rear axles 4 and 5 respectively and with the usual wheels, 6, thereon. Secured to the rear axle 5 by means of clips 7 is a plate or sixth wheel 8 having lugs 9 extending therefrom over which two of the clips 7 pass. The sixth wheel or plate 8 is provided with an outer circular track 10 and at its front with a lug 11, to which braces 12 are secured for properly maintaining the sixth wheel in place and relieving it of certain strains and also for bracing the axles at their outer ends. Secured to the upper framework C and 3 by clips 13 and 14 is an upper bearing plate 15 curved in shape and having tracks 16 to correspond with the circular tracks 10 of the sixth wheel. Made integral with the plate 15 and substantially at its center is a king-bolt 17 passing through the sixth wheel 8 and firmly secured thereto by a nut 18 and washers 19.

It will be understood that in describing the sixth wheels and their appurtenant mechanism I have in mind that the same or similar devices are to be applied in the form of a fifth wheel to the front axle. However, a description of one will suffice for both. On both the fifth and sixth wheels I provide beveled racks 20 and on top of the bearing plates 15 near the center thereof and integral with them, I provide bosses or bearings 21 for a shaft 22. The shaft 22 is provided near each end with beveled gears or pinions 23 for engagement with the racks 20. The shaft 22 is also provided with a worm gear 24 to mesh with a worm 25 which may be driven in any suitable manner from the body of the vehicle. If the vehicle is drawn by a horse or other animal the gear and worm 24 and 25 are usually omitted.

From the above it will be apparent that whenever one of the axles is turned about the king-bolt 17 as a center, either by means of the gear and worm 24 and 25 or because of a change in direction of the pulling means, the other axle will move simultaneously but in the opposite direction, as shown in dotted lines in Fig. 1. Preferably I place the king-bolt 17 in front of the rear axle and behind the front axle, as shown, so that with a given width of body, a shorter turn may be given the vehicle.

To aid in removing the unnatural side strains both when the vehicle is unevenly loaded and when the axle is turned relatively to the bearing plate 15, I provide another plate 26 secured to the bearing plate 15 by means of a boss 27 and bolt 28 passing between the legs or spokes of the sixth wheel 8. The plate 26 is also provided with an aperture through which the king-bolt 17 is passed to form a bearing therefor beneath the sixth wheel and so that the plate 26 is securely fastened thereto by means of the nut 18. The plate 26 is also provided with two legs 29 which extend radially forward from the rear king-bolt 17 and which at their ends are provided with bosses 30. The bosses 30 are secured to extensions on the upper bearing plate 15 by means of eye-bolts 31 and nuts 32, thus forming clips or supports at the edge of the sixth wheel to firmly hold the same to the plate and prevent injury to the king bolt, the eyes of bolts 31 being arranged to engage the reaches 1 and 2 so that the whole sixth wheel and its appurtenant mechanism may be properly supported.

Adjacent the eye-bolts 31 and within sockets in the tracks 16 I provide bearing shoes 33 for adjusting and regulating the amount of friction on the sixth wheel and also for adjusting for wear. This adjustment is made by means of set screws 34.

In order to properly protect the gearing from mud and dirt I provide a protecting covering 35 secured in any suitable manner as to the reaches 1 and 2. Bearings 36 and 37 may also be provided for the shaft 22 in order that it may be held rigidly in place.

In order that the strains may be properly taken care of no matter how the load is situated in the vehicle I provide an independent clip 38 with each fifth or sixth wheel. This clip 38 is secured to said wheel by means of screws 39 and is provided with a friction adjusting shoe and set-screw 40 similar to that shown in Fig. 5. Thus the plate 26 is rigidly connected with the plate 15 at points on both sides of the king bolt and the plate 15 is clipped to the sixth wheel on both sides of the axle.

In order to properly allow for wear and to allow for stresses after a certain amount of wear has taken place I have provided the king-bolt 17 with a metallic washer 41 and above the washer 41 a leather washer 42. The metallic washer 41 is provided with projections which extend through the leather washer 42 and into apertures in the plate 15. This prevents the metallic washer 41 from turning relative to the leather washer 42 and wearing out the same, and yet gives the proper resilient play between the sixth wheel 8 and the bearing plate 15.

Without the clips or their equivalent the upper and lower plates would have to be made impracticably heavy, otherwise the give to the plates would cause loss of motion between the racks and pinions. Furthermore, even if the plates were made extremely heavy and stiff the whole strain would fall upon the king bolt and its supports, thus causing excessive wear if not breakage, as well as lost motion between the plates. The clips or their equivalent not only prevent excessive wear on the king bolt and its supports but also by so preventing, maintain the pinions and racks in rigid mesh to prevent lost motion and permit of proper adjustment and form means for compensating for what little wear there is. It will be clear that the upper and lower plate 16 and 8 will, after more or less wear, become separated to a certain extent. This will allow the pinions to be partially or wholly disengaged from their racks. By properly adjusting the screws 34 and 40, however, the clips will properly maintain the axle plates and body plates together so that the pinions will be properly kept in mesh with their racks. If the nut 18 or equivalent means were not provided the axle and body plates would be liable to separation anyway, thus rendering the pinions and their racks liable to separation, but the clips, etc. prevent this as above described and keep the pinions in proper mesh with their racks and the screws allow of proper adjustment for wear.

To prevent the axles turning too far about the king-bolts as centers and thus cramping the wheels I provide stops 43 which consist of a block of fibrous material, such as compressed paper, secured to the sixth wheel 8 near the projection 11. When the shaft 22 is turned the proper distance the ends of the bearing plate 15 come in contact with the stops 43 and prevent further turning of the axles.

Referring to Figs. 6 to 11 inclusive I have shown an arrangement embodying various of my improvements but in which the turning center or king-bolt is placed at the axle. These various figures show the device as applied to the rear axle but it will be understood that the same device may be applied to the front axle, or any other device may be applied to the front axle such as that shown in Figs. 1 to 5, for instance. The device shown in Figs. 6 to 11 inclusive is provided with the sixth wheel 44 having a complete circular track 45. The wheel 44 is secured to the rear axle 5 by means of clips 46 two of which engage lugs 47 extending from said sixth wheel along the axle. The sixth wheel 44 is provided with an integral rack 48 for engagement with the gear or pinion 23 of shaft 22. A king-bolt 49 maintains the pivotal axis between the sixth wheel and a bearing plate 50 above it. The bearing plate 50 is provided with a complete circular track 51 for engagement with and bearing upon the circular track 45 and is secured to the body or framework of the vehicle by means of clips 52. The plate 50 is also provided with an integral bearing or boss 21 for the shaft 22. The reaches 1 and 2 are also connected in this construction by an integral cross piece 3, and a dirt guard or protector 35 is provided. In this construction, however, I show a second plate 53 bent to firmly engage the axle as at 54 and extending upward and forward to form a support for the sixth wheel as at 55. At the rear of the axle this plate extends around the edges of the sixth wheel 44 and bearing plate 50 to form a clip 56. The clip 56 is provided with a friction adjusting shoe 57 and set-screw therefor 58. An independent clip 59 similar to the clip 38 is provided at the edges of the sixth wheel and bearing plate diametrically opposite the clip 56. In this construction I also show clips 60 and 61 for aiding in taking side stresses, these clips being arranged directly over the axle 5, and the clip 61 being made integral with the sixth wheel 44. The clips 60 and 61 may or may not be provided with the friction adjusting means I have already described. The plate 53 should preferably extend lengthwise of the vehicle.

It will be evident from the above that I have devised a turning and steering mechanism which is extremely simple and easy to construct and assemble and one in which all unusual and unnatural strains are well provided for, one in which wabbling and zigzagging may be entirely eliminated, and one in which the various parts are so arranged that each part may be constructed of the proper size to withstand those stresses which fall upon it. In prior vehicles these features have not been found and those vehicles have accordingly failed both practically and commercially.

It is evident, although I have shown two somewhat different structures, as exemplified by Figs. 1 to 5 and Figs. 6 to 11, that the various features in these different structures may be used interchangeably or additionally nevertheless. For instance the plate 53 might well replace the plate 26 and vice versa, and I do not, therefore, limit myself to any one structure shown and described but have given this description with the idea in mind that any or various of the parts or features used in one structure may be used additionally in the other. I have also shown and described my improvements in great detail but do not desire to be limited to the exact details shown and described, but

What I claim and desire to secure by Letters Patent, is:

1. In a vehicle, the combination with the front and rear axles of a fifth wheel on the front axle, a sixth wheel on the rear axle, racks on said wheels, a shaft having pinions substantially at its ends to engage said racks, said shaft and racks being above the plane of said wheels, a bearing plate for said sixth wheel secured to the body of the vehicle, means for adjusting the amount of friction between said plate and sixth wheel and a covering and protecting device for the rack and gear at the rear axle.

2. In a vehicle, the combination of front and rear axles, a fifth wheel on the front axle, a sixth wheel on the rear axle, racks on said wheels, a shaft and pinions for operating said racks and wheels simultaneously, a plate for each wheel secured to the body of the vehicle and arranged to bear on said wheels, another plate secured at one of said wheels and below it, reaches extending over said last mentioned wheel and eye-bolts for securing said reaches to said last mentioned plate.

3. In a vehicle, the combination of a body, front and rear axles, fifth and sixth wheels on said axles, shafting and gears for rotating said wheels, plates above said wheels secured to the body, king bolts for said wheels situated between the axles and a member at each wheel and extending below the same to form a bearing for the king bolt thereat, each of said members being rigidly secured to its plate at points on opposite sides of its king bolt.

4. In a vehicle, the combination of a body, front and rear axles, fifth and sixth wheels on said axles, shafting and gears for rotating said wheels, plates above said wheels secured to the body, king bolts for said wheels and a member extending below one of said wheels and forming a bearing for the king bolt therebeneath, said king bolts being situated between the axles, and clips or supports on both sides of the axle thereat, said clips or supports being arranged to hold said wheels and plates firmly together.

5. In a vehicle, the combination of a body, front and rear axles, fifth and sixth wheels on said axles, shafting and gears for rotating said wheels, plates above said wheels secured to the body, king bolts for said wheels situated between the axles and a member at each wheel and extending below the same to form a bearing for the king bolt thereat, each of said members being rigidly secured to its plate, by clips or supports on opposite sides of the king bolt.

6. In a vehicle, the combination of a body, front and rear axles, fifth and sixth wheels on said axles, shafting and gears for rotating said wheels, plates above said wheels secured to the body, king bolts for said wheels and a member extending below one of said wheels and forming a bearing for the king bolt therebeneath, said king bolts being situated between the axles and said bearing member being secured to its plate at a plurality of points between the axles and on opposite sides of the king bolt.

7. In a vehicle, the combination of a body, front and rear axles, fifth and sixth wheels on said axles, shafting and gears for rotating said wheels, plates above said wheels secured to the body, king bolts for said wheels situated between the axles and a member at each wheel and extending below the same to form a bearing for the king bolt thereat, each of said members being rigidly secured to its plate, by clips or supports at the edges of the wheel and arranged on opposite sides of the king bolt and shafting.

8. In a vehicle, the combination of a body, front and rear axles, fifth and sixth wheels on said axles, shafting and gears for rotating said wheels, plates above said wheels secured to the body, king bolts for said wheels situated between the axles and a member at each wheel and extending below the same to form a bearing for the king bolt thereat, each of said members being rigidly secured to its plate, by clips or supports arranged on both sides of the rack and pinion.

9. In a vehicle, the combination of a body, front and rear axles, fifth and sixth wheels on said axles, shafting and gears for rotating said wheels, plates above said wheels secured to the body, king bolts for said wheels situated between the axles and a member at each wheel and extending below the same to form a bearing for the king bolt thereat, each of said members being rigidly secured to its plate, by clips or supports arranged on both sides of the rack and pinion, said clips or supports being arranged to firmly hold the plates and wheels together.

10. In a vehicle, the combination of a body, front and rear axles, fifth and sixth wheels on said axles, shafting and gears for rotating said wheels, plates above said wheels secured to the body, king bolts for wheels situated between the axles and a member at each wheel and extending below the same to form a bearing for the king bolt thereat, each of said members being rigidly secured to its plate, at substantially equidistant points about the edges of said wheels to properly support said wheels.

11. In a vehicle, the combination of front and rear axles, plates secured to each axle, king bolts therefor, racks and circular tracks on said plates, plates secured to the body of the vehicle and arranged to rest on the axle plates, shafting and pinions for operating said racks, means arranged to substantially maintain contact between the axle plates and body plates, and flexible washers around said king bolts arranged to permit a certain amount of tilting of the axle without straining the king bolts.

12. In combination with the front and rear axles of a vehicle, axle plates on each axle having circular tracks, king bolts at the center of said tracks and between the axles, upper plates arranged to rest on said axle plates in support of the vehicle body, a third plate below each axle plate, each third plate being secured to the upper plate between the axle and king bolt and at the opposite side of the king bolt in support thereof, and means for compelling the axle plates to revolve simultaneously in opposite directions.

13. In a vehicle, the combination of front and rear axles, a fifth wheel on the front axle, a sixth wheel on the rear axle, racks on said wheels, a shaft for operating said racks and wheels simultaneously, a plate for each wheel secured to the body of the vehicle and adapted to bear on said wheels and another plate secured below one of said wheels and extending about the edges of said last mentioned plate and wheel to form a clip, a shoe and set-screw arranged at said clip to adjust the amount of friction on said wheel and an independent clip provided with means for adjusting the amount of friction between said wheel and the plate above it.

14. In a vehicle, the combination with front and rear axles, of a fifth wheel on the front axle, a sixth wheel on the rear axle, racks on said wheels, a shaft having pinions engaging said racks to operate them simultaneously, plates secured to the body of the vehicle and arranged to bear on said fifth and sixth wheels and a plurality of clips for each of said wheels, engaging said wheels and plates, to maintain said racks and pinions in proper mesh.

15. In a vehicle, the combination of front and rear axles, a plate secured to one axle, a rack on said plate, a pinion for engaging said rack, shafting for mechanically connecting said pinion with the other axle, a plate fixed to the body of the vehicle and bearing upon said first mentioned plate and means for maintaining said plates together to keep the rack and pinion thereof in proper mesh, said means embracing a plurality of clips spaced about the edges of said plates.

16. In a vehicle, the combination of front and rear axles, a plate secured to one axle, a rack on said plate, a pinion for engaging said rack, shafting for mechanically connecting said pinion with the other axle, a plate fixed to the body of the vehicle and bearing upon said first mentioned plate and means for maintaining said plates together to keep the rack and pinion thereof in proper mesh, said means embracing clips with adjusting screws for maintaining said plates together.

17. In a vehicle, the combination of front and rear axles, a plate secured to each axle, king bolts therefor, a rack on each of said plates, a pinion for each rack, shafting connecting said pinions to operate the plates simultaneously, plates secured to the body of the vehicle and arranged to rest on said axle plates, and clipping means for adjustably maintaining said axle plates and body plates together to keep said racks and pinions in proper mesh.

18. In a vehicle, the combination of front and rear axles, a plate secured to each axle, king bolts therefor, a rack on each of said plates, a pinion for each rack, shafting connecting said pinions to operate the plates simultaneously, plates secured to the body of the vehicle and arranged to rest on said axle plates, and clipping means for adjustably maintaining said axle plates and body plates together to keep said racks and pinions in proper mesh, said means including a plurality of clips spaced about the periphery of each axle plate and adjusting screws coöperating with said clips.

19. In a vehicle, the combination of front and rear axles, a plate secured to each axle, king bolts therefor, a rack on each of said plates, a pinion for each rack, shafting connecting said pinions to operate the plates simultaneously, plates secured to the body of the vehicle and arranged to rest on said axle plates, and clips for adjustably maintaining said axle plates and body plates together to keep said racks and pinions in proper mesh, said pinions being above said racks and said plates all having circular bearing tracks.

20. In a vehicle, the combination of front and rear axles, a plate secured to each axle, king bolts therefor, a rack on each of said plates, a pinion for each rack, shafting connecting said pinions to operate the plates simultaneously, plates secured to the body of the vehicle and arranged to rest on said axle plates, and clipping means for adjustably maintaining said axle plates and body plates together to keep said racks and pinions in proper mesh, said means including a plurality of clips spaced about the periphery of each axle plate and adjusting screws coöperating with said clips, and bearing blocks at the inner end of said screws, said pinions being above said racks and said plates all having circular bearing tracks.

In testimony whereof, I have signed my name to this specification, in the presence of two subscribing witnesses.

JOHN M. EADIE.

Witnesses:
GORHAM CROSBY,
EDWIN SEGER.

Copies of this patent may be obtained for five cents each, by addressing the "Commissioner of Patents, Washington, D. C."